United States Patent
Echevarria et al.

(10) Patent No.: US 12,283,107 B1
(45) Date of Patent: Apr. 22, 2025

(54) INTELLIGENCE SURVEILLANCE AND RECONNISSANCE APPARATUS

(71) Applicant: Government of the United States, as represented by the Secretary of the Air Force, Wright-Patterson AFB, OH (US)

(72) Inventors: Jacob Echevarria, Colorado Springs, CO (US); Michael Anderson, Colorado Springs, CO (US); Katherine Fitzpatrick, Colorado Springs, CO (US); Evan Pomfret, Colorado Springs, CO (US); Abigail Price, Colorado Springs, CO (US); Sarah Galyon Dorman, Monument, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 112 days.

(21) Appl. No.: 18/339,662

(22) Filed: Jun. 22, 2023

Related U.S. Application Data

(60) Provisional application No. 63/480,687, filed on Jan. 19, 2023.

(51) Int. Cl.
| | |
|---|---|
| *G06V 20/00* | (2022.01) |
| *G06V 20/52* | (2022.01) |
| *H04N 23/11* | (2023.01) |
| *H04N 23/695* | (2023.01) |

(52) U.S. Cl.
CPC ............. *G06V 20/52* (2022.01); *H04N 23/11* (2023.01); *H04N 23/695* (2023.01)

(58) Field of Classification Search
CPC ....... G06V 20/52; H04N 23/11; H04N 23/695
See application file for complete search history.

(56) References Cited

U.S. PATENT DOCUMENTS

| | | | |
|---|---|---|---|
| 10,683,045 B2 * | 6/2020 | Sellner ................... | B62D 57/00 |
| 2010/0152922 A1 * | 6/2010 | Carlson ................... | B60B 9/10 |
| | | | 180/218 |
| 2012/0185087 A1 * | 7/2012 | Kang ................... | B62D 57/024 |
| | | | 901/1 |

(Continued)

OTHER PUBLICATIONS

Echavarria, et al., Capstone Design Case Study: Developing a System for Covert Payload Emplacement, AIAA 2023-0446, Jan. 19, 2023, Scitech 2023, National Harbor, MD and online.

*Primary Examiner* — Frank F Huang
(74) *Attorney, Agent, or Firm* — AFMCLO/JAZ; Larry L. Huston

(57) ABSTRACT

An apparatus for gathering intelligence, surveillance and reconnaissance [ISR] in a hostile environment. The apparatus may be generally cylindrical to blend in with the environment, particularly with indicia which are visible to people viewing the apparatus. The apparatus may have a tinted skin which does not allow viewers to see inside. Inside the apparatus are one or more sensors which gather the ISR. The sensors may be disposed on a payload delivery mechanism having a first, retracted position inside the hollow body and extending outwardly through a port to a second position to deliver a payload to a hostile target. The sensor may be separable from the apparatus or may remain internal to the apparatus.

22 Claims, 8 Drawing Sheets

(56) References Cited

U.S. PATENT DOCUMENTS

| | | | |
|---|---|---|---|
| 2012/0273284 A1* | 11/2012 | Nesnas | B62D 21/04 |
| | | | 180/218 |
| 2017/0225336 A1* | 8/2017 | Deyle | B25J 11/008 |
| 2018/0071909 A1* | 3/2018 | Bewley | B62D 57/02 |
| 2019/0266414 A1* | 8/2019 | Stawiszynski | G06Q 50/26 |
| 2021/0116223 A1* | 4/2021 | Caldwell | F42B 27/00 |
| 2021/0208949 A1* | 7/2021 | Bijwe | G06F 9/5005 |

* cited by examiner

INTELLIGENCE SURVEILLANCE AND RECONNISSANCE APPARATUS

CROSS REFERENCE TO RELATED APPLICATION

This application claims priority to and the benefit of provisional U.S. patent application Ser. No. 63/480,687 filed Jan. 19, 2023, the disclosure of which is incorporated herein by reference.

STATEMENT OF GOVERNMENT INTEREST

The invention described and claimed herein may be manufactured, licensed and used by and for the Government of the United States of America for all government purposes without the payment of any royalty.

FIELD OF THE INVENTION

The present invention is related to a remotely controllable apparatus for attaching a payload to a target surface and more particularly to such an apparatus which can conceal a payload during motion and externally deploy the payload when a target is reached.

BACKGROUND OF THE INVENTION

Hostile targets, such as a vehicle, are often mobile. For several missions, it is often helpful to monitor these hostile targets as to location and other intelligence and surveillance data. But it is typically infeasible to have a person deploy an apparatus for intelligence and surveillance, due to safety concerns. And it is infeasible to place a payload proximate a target without an apparatus to deploy the payload. Accordingly, a new approach is needed which overcomes each of the conjugate problems of remote deployment, travel over rough terrain, concealing the payload during travel and externally deploying the payload, while having an appearance suitable for covert missions, is remotely controllable and which can safely deploy a payload to a target.

SUMMARY OF THE INVENTION

In one embodiment the invention comprises an apparatus for delivering a payload in a hostile environment. The apparatus comprises a hollow body having a longitudinal axis and a port therethrough, a longitudinally elongate gravity stable frame disposed within the hollow body; the frame having an upper surface and a lower surface opposed thereto, two longitudinally opposed, axially rotatable wheels, operably associated with the body, a battery powered motor rotatably associated with each wheel, a controller for controlling the battery powered motor, a receiver for receiving remote control signals from an operator and feeding the control signals to the controller, at least one counterweight joined to the frame below the longitudinal axis, whereby the at least one counterweight is adapted to keep the frame gravity stable, a payload delivery mechanism (PDM), the PDM being concealable within the body while the body is in motion and being configured to discharge a payload from inside the hollow body, through the port and to a target at the point of deployment and a battery joined to the frame for powering the apparatus.

DETAILED DESCRIPTION OF THE INVENTION

Figure 1:
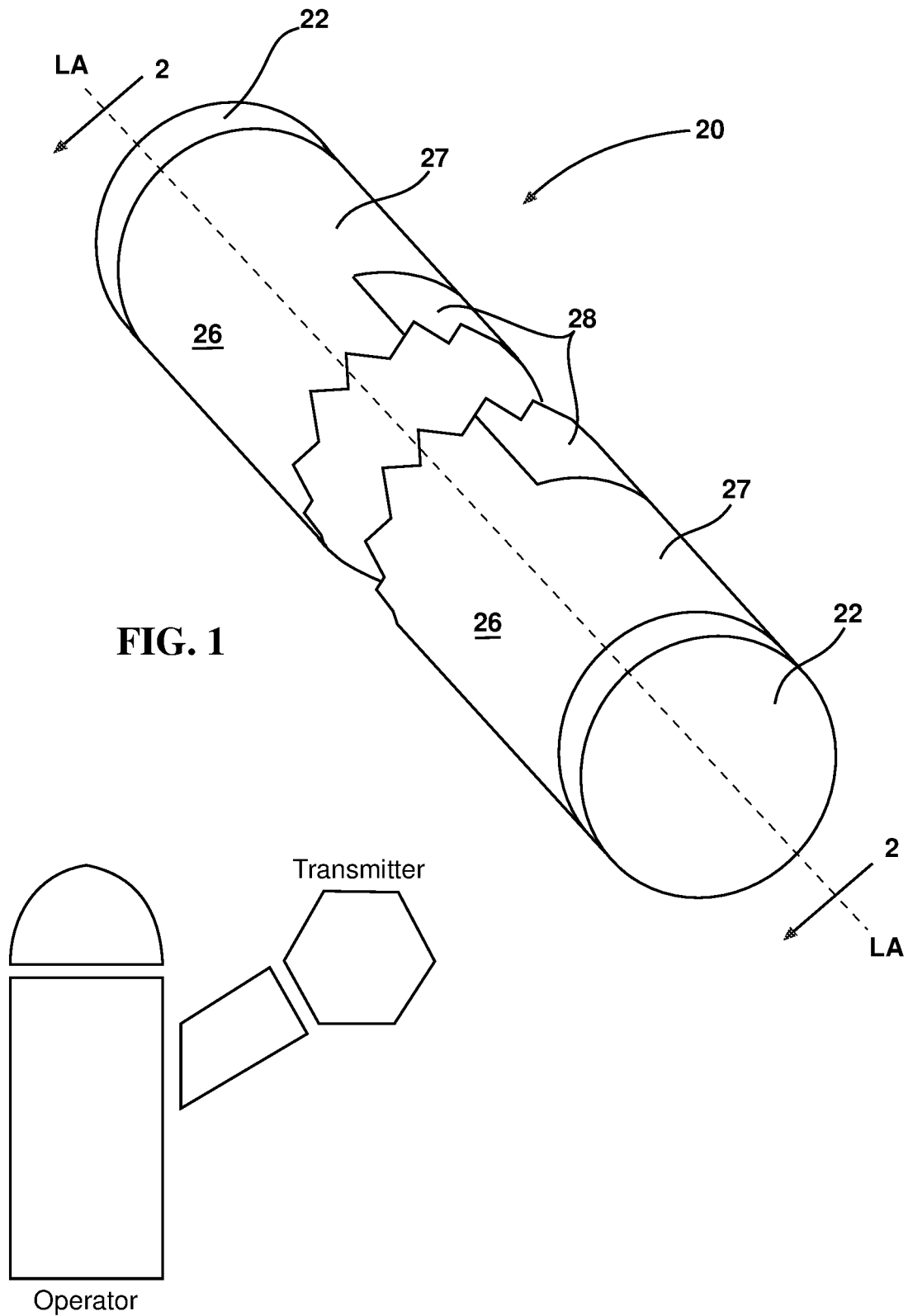
FIG. 1 is a broken perspective view of one embodiment according to the present invention having indeterminate length.

Referring to FIG. 1, the invention is a covert apparatus 20 for delivering a payload 51 in a hostile environment. The apparatus 20 may be used indoors or outdoors, as needed. Preferably the apparatus 20 is used on a relatively flat floor or ground to reduce blockage by obstructions or ditches, although slopes may be tolerated.

Figure 2:
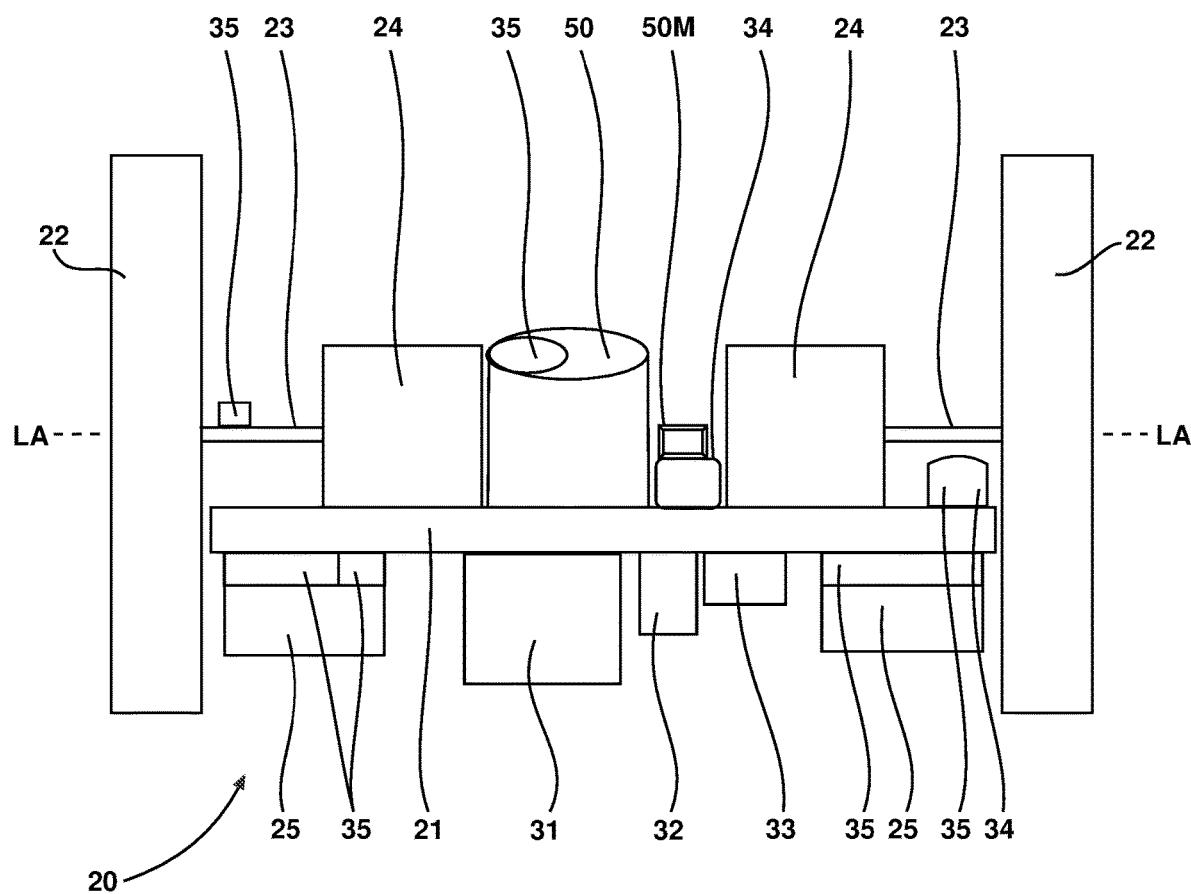
FIG. 2 is a determinate length instantaneous frontal vertical sectional view taken along lines 2-2 of FIG. 1.

Referring to FIG. 2, the apparatus 20 comprises a hollow body 27 intermediate and flanked by two outboard wheels 22. The hollow body 27 and wheels 22 are preferably concentric about a longitudinal axis LA. The longitudinal axis LA has a centerline plane perpendicular and radial thereto. The centerline plane is disposed longitudinally halfway between the wheels 22. Alternatively, the wheels 22 could rotate about a different axis, preferably above the longitudinal axis LA to lower the center of gravity. The longitudinal axis LA is substantially horizontally oriented when the apparatus 20 is placed on a flat, level support surface. Accordingly, the apparatus 20 is considered to be horizontally oriented.

The hollow body 27 is encased by a skin 26 concealing and protecting the internal components and having a port 28 therethrough. While a body 27 having a skin 26 with a cylindrical shape and of constant cross section is illustrated, one of skill will recognize the invention is not so limited. The body 27 may be of variable cross section or non-cylindrical, so long as the body 27 is gravity stable and has clearance above the wheels 22.

Internal to the skin 26 is a longitudinally elongate plank frame 21 which mounts the other components and extends substantially the length of the hollow body 27. The frame 21 is generally planar having mutually opposed upper and lower surfaces. The upper surface may hold components such as a payload 51 delivery mechanism (PDM) 50, a camera 34, one or more wheel motors 24 operably connected to the wheels 22 by respective axles 23. The PDM 50 Is concealable inside the body 26 for travel and covert surveillance and may be deployed at the point of use. The wheels 22 may be direct drive or connected to the motors 24 via a gear box. The lower surface of the frame 21 may hold counterweights 25 for balance, a battery pack 31, a motor controller 32 and RC transceiver 33.

Examining the invention in more detail, the skin 26 of the hollow body 27 may be aluminum, plastic, carbon fiber or any material which helps the apparatus 20 appear indigenous to the environment and protects internal components. The skin 26 is preferably opaque, to conceal the internal components from hostile actors. The skin 26 may be externally covered with graphics and/or indicia to resemble a beverage can, a can of tennis balls, water bottle, pipe section, etc. or other such object as may blend in with that environment or become scenes a faire. Such a skin 26 is herein referred to as a camouflage skin 26. The camouflage skin 26 may comprise window tint film as are known to allow the camera 34 to see outwardly and intercept incoming radiation waves [IR, UV and/or visible wavelengths] for carrying out the mission. But such a skin 26 is opaque to someone looking into the apparatus from the outside. A PET laminate film having dyed, carbon, ceramic or hybrid indicia may be suitable. The apparatus 20 may have both forward and rearward looking cameras 34. The skin 26 may be acoustically transparent to allow soundwaves to intercept a microphone type sensor 35.

The hollow body 27, and particularly the skin 26 thereof, has a port 28 therethrough. The port 28 is functionally juxtaposed with the PDM 50, so that the PDM 50 can emerge therethrough upon actuation. The port 28 can be a cutout in the skin 26 with a tight fit, to allow visual continuity of any indicia or graphics. The port 28 is covered by a closure. The closure may be hinged or may be magnetic and rigidly attached to the top of the PDM 50 as discussed below.

The wheels 22 are axially rotatable about the longitudinal axis LA and relative to the frame 21. The wheels 22 are preferably only slightly larger in diameter than the body 27, to appear less conspicuous. The wheels 22 may be made of rubber or soft plastic for traction and covered with graphics and/or indicia to match the skin 26. If graphics and aesthetics are a consideration, preferably the wheels 22 have minimal tread to blend in with the environment.

The wheels 22 are axially driven. Preferably each wheel 22 is independently driven by a dedicated motor 24. Each motor 24 is preferably mounted to the upper surface of the frame 21 to lower the center of gravity (CG), juxtaposed with and inboard of the respective wheel 22. The wheels 22 may be co-rotatable, i.e. rotating in the same direction, for forward or reverse propulsion. And the wheels 22 may be counter-rotatable, i.e. rotating in opposite directions for turning with a near-zero turn radius. A 12 VDC, permanent magnet motor 24 having a stall torque of at least 87 newton centimeters, 120 no load rpm, and 6 mm shaft diameter has been found suitable, although brushless DC motors 24 are also contemplated.

The body 27 may have a length in the axial direction, inclusive of the wheels 22 ranging from about 12 cm to about 24 cm. The skin 26 may have a diameter of about 6 cm to about 10 cm and the wheels 22 may have a diameter about to about 2 mm greater in diameter than the skin 26 and preferably about 5 mm to about 15 mm greater in diameter than the skin 26.

The longitudinally elongate frame 21 may be generally planar in order to support the internal components on both the opposed upper surface and lower surface. Alternatively, the frame 21 may have a downward step inboard of the axles 23, to lower the CG. The frame 21 may be solid and may of any rigid material, such as plastic, balsa wood, aluminum, carbon fiber, etc., so that the wheels 22 can rotate with respect to the frame 21, skin 26 and associated components. Alternatively, the frame 21 may be mesh, to conserve weight.

One or more counterweights 25 and battery 31 are preferably mounted to the lower surface of the frame 21 so that the apparatus 20 is gravity stable. By gravity stable, it is meant that the body 27 generally has the same surface facing upwards, downwards, etc. when the apparatus 20 is on a support surface. The counterweights 25 function to keep the PDM 50 upright and facing vertically upwards or in any other desired orientation for later deployment. The counterweights 25 may be lead or any sufficiently dense material for fitting into the available space. Two counterweights 25 may be used, so that one counterweight 25 may be juxtaposed with each wheel 22 for traction. Alternatively, a single counterweight 25 may be juxtaposed with the middle of the body 27 for balance. For the embodiments described and claimed herein a total counterweight 25 load of about 200 g to about 500 g, and particularly about 300 g, has been found suitable.

A battery 31 to power the wheel 22 motors 24, camera 34, transceiver 33 or receiver 33, PDM 50, etc. is mounted on the lower surface of the frame 21 to lower the CG. Alternatively, the camera 34, or other component(s), may have a dedicated battery 31. A 14.8 volt lithium polymer batter 31 with a capacity of 1100 mAh to 2000 mAh has been found to be suitable. Alternatively, the camera 34, or other component(s), may have a dedicated battery 31. A 3.7 volt lithium polymer battery 31 having a capacity rating of about 800 mAh to about 1000 mAh has been found to be suitable for an apparatus 20 having a dedicated camera 34 battery 31.

A motor controller 32 may also be mounted to the lower surface of the frame 21. The motor controller 32 accepts commands from the radio controller 32 and converts these commands to motor(s) 24 action to forward drive, backwards drive and/or turn the apparatus 20. A Sabertooth 2×5, 5 amp motor controller 32 having a 32 kHz switching speed has been found suitable when used in conjunction with the 14.8 volt lithium polymer batter 31. The motor controller 32 is connected to and in electrical communication with an RF receiver 33. The RF receiver 33, in turn, may be paired with an off-board R/C transmitter to receive drive commands from the operator. A four channel, 2048 resolution AR400 Receiver 33 available from Spektrum of Champaign, IL has been found suitable.

The apparatus 20 also preferably has a first person view (FPV) camera 34. The FPV camera 34 is forward looking for steering. Preferably the camera 34 is joined to the upper surface of the frame 21 for elevation in use. The lens of the camera 34 may aligned with a hole through the skin 26 for viewing or may be aligned with a one-way mirror coating. As used herein, when two components are joined or connected the components may be interchangeably contiguously joined together or connected with an intervening element therebetween.

A common and suitable sensor 35 for use with the apparatus 20 is a camera 34. The camera 34 may be Wi-Fi enabled with a 6.35 mm CMOS sensor 35 and wide angle field of view, such as at least 150 degrees. The camera 34 may have it's own Wi-Fi signal which is output to a monitor viewable by the operator. The camera 34 may be powered by a powered by a 1000 mAh 3.7 V lithium polymer battery 31. Preferably the camera 34 has a delay to the output to the display less than 100 ms, more preferably less than 50 ms and even more preferably less than 25 ms.

One or more sensors 35, including a 4G/5G GPS tracking device, may be joined to the payload 51, the upper surface or the lower surface of the frame 21. The tracking device provides feedback of the location of the apparatus 20 or payload 51 to the operator and preferably has an accuracy of at least 2.5 m and operates at 900/1800 Mhz. A SparkNanoFXB 7.0 tracker available from BrickHouse Security of Indianapolis, IN has been found suitable. Other sensors 35 which may be used include microphones, gyroscopes, accelerometers, measuring wheels, wheel encoders, GPS trackers, environmental sensors 35 including thermometers, inertial measurement unit (IMU), radiation detectors, mass spectrometers, etc. Particularly, suitable sensors 35 include the SparkFun SPH9978LR5H-1 Microphone, the SparkFun LSM6DSO 6 degree-of-freedom accelerometer and gyroscope sensor 35, the SparkFun SEN-11769 Line Follower sensor 35, the EM-506 GPS receiver module, and the BME-680 Environmental Sensor 35, and the SparkFun ISM330DHCX 6-degree-of-freedom Inertial Measurement Unit, all available from SparkFun Electronics of Niwot, Colorado. The Intel RealSense D435i camera available from Intel Corporation of Santa Clara, CA is suitable for obtaining 3-dimensional imagery with a depth point cloud. The sensors 35 may be forward facing, rearward facing or both.

Figure 3:
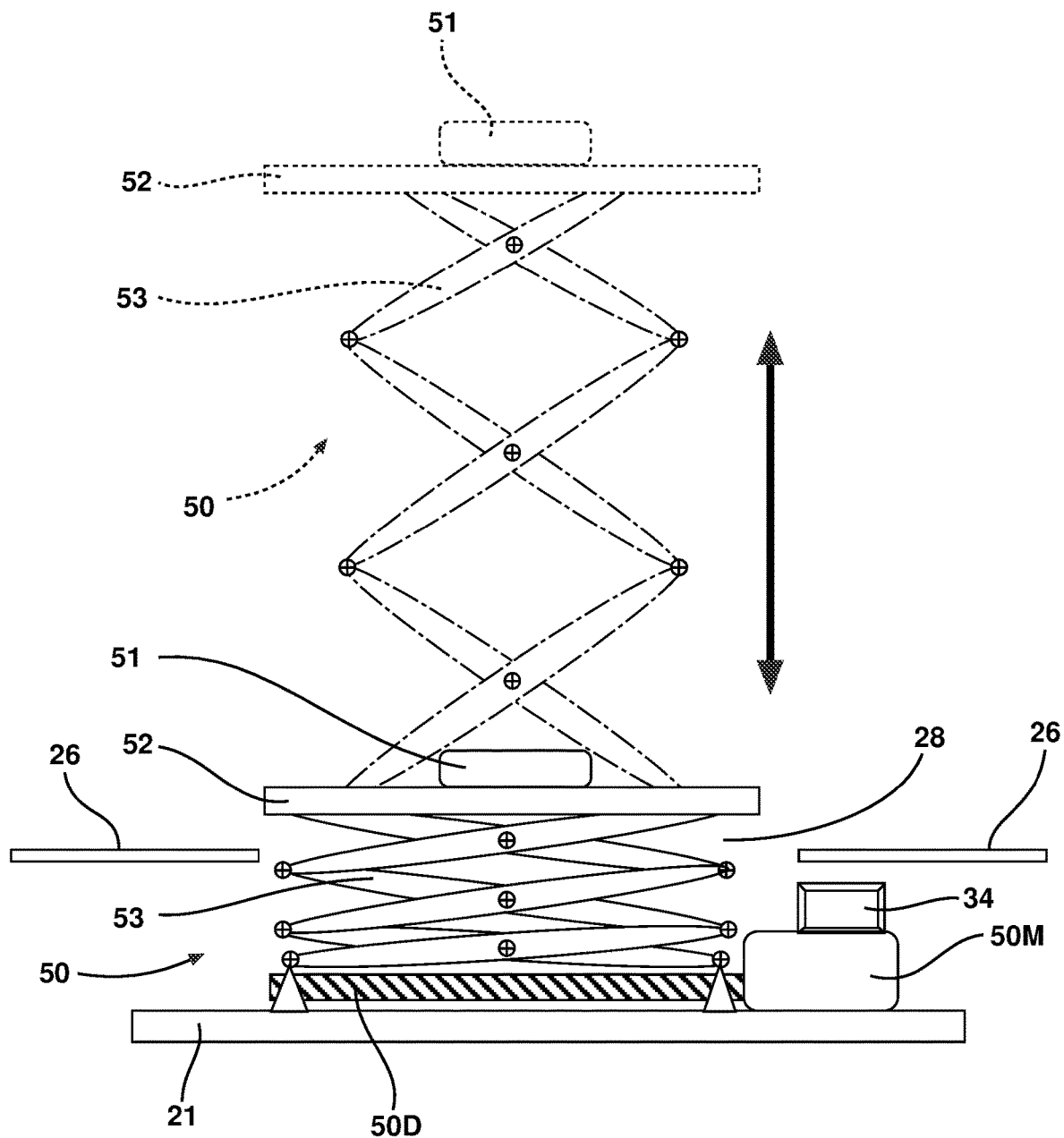
FIG. 3 is an instantaneous enlarged fontal view of the payload delivery mechanism of FIG. 2 shown in a semi-retracted position, with an extended position shown in phantom.
Figure 3A:
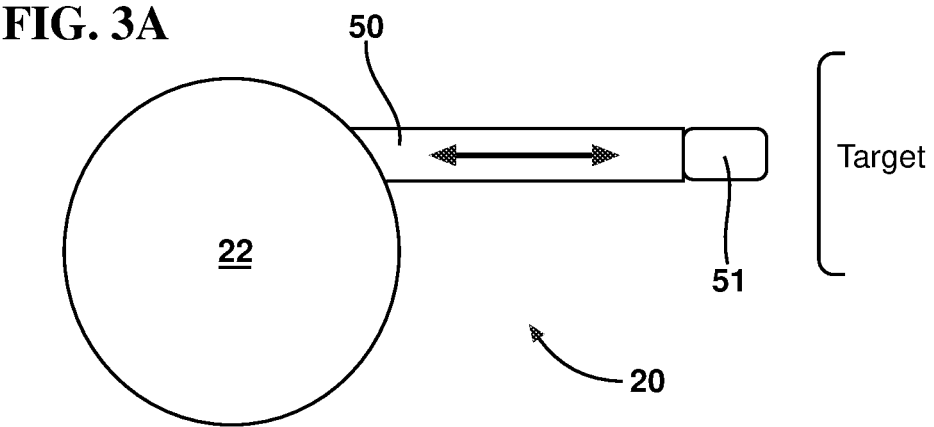
FIG. 3A is a side elevational view of an apparatus having a payload delivery mechanism which deploys in a horizontal direction.

Referring to FIG. 3 and FIG. 3A, the PDM 50 comprises a scissor jack 53 having a proximal end joined to the upper surface of the frame 21. The PDM 50 has a distal end which is extendible through the port 28. In a retracted position the PDM 50 is entirely concealable within the skin 26 of the body 27. Upon actuation the PDM 50 extends through the port 28 to an extended position. The distal end of the PDM 50 may have a stand 52 for supporting a payload 51 thereon. The payload 51 may comprise the camera 34, an explosive device or other sensor 35 as described herein.

The scissor jack 53 may be powered in known fashion by a servomotor 50M which is controlled by the receiver 33. The scissor jack 53 may have a longitudinally parallel drive screw 50D, to conserve footprint and diameter of the body 27. The servomotor 50M drives the screw 50D for bilateral extension and retraction of the scissor jack 53 in known fashion. The PDM 50 extends vertically or optionally in any other direction radial to the longitudinal axis LA. For example, if desired, the PDM 50 may extend horizontally for attachment to, or to attach a payload 51 to, a vertical surface. The scissor jack 53 embodiment provides the benefit of being capable of handling relatively heavy payloads 51 including plural sensors 35.

If desired, the payload 51 may comprise one or more sensors 35. For example, when conducting ISR it may be desirable to have a photo or real time surveillance during the mission. The apparatus 20 can be maneuvered into position, or nearly so as hostile conditions permit. But if more elevation is needed for accurate data collection and input from the sensors or if an obstruction is in the way, the PDM 50 may elevate the payload 51, so that the sensor 35 is no longer obscured and can receive input without being blocked by the obstruction. For example, a sensor 35 comprising a camera 35 may need to be above the elevation of the obstruction in order for the lens not to be blocked. Or, for example, a radiation detector type sensor 35 may have incoming ionizing radiation blocked unless elevated above the height of the obstruction. By disposing the sensor 35 on the stand 52 as a payload, these obstructions can advantageously be overcome with the present invention. Furthermore, if the sensor 35 is disposed on the stand 52 above the hollow body 27, the sensor may be rotatable in known fashion, up to 360 degrees, about the vertical axis. By vertical axis it is meant the axis parallel to the extension and retraction direction of the bilateral PDM. This arrangement provides the benefit that while the apparatus 20 is in position the sensor 35 can gather information in all directions without repositioning the apparatus 20.

The stand 52 may have one or more permanent magnets or electromagnets for attachment to the underside or a vehicle or another ferrous object of interest. Two permanent magnets, each having 11.33 kg attachment force, such as are available from K&J Magnets of Pipersville, PA as model BCA6 have been found suitable. One or more sensors 35 may be disposed on the PDM 50 and particularly on the stand thereof stand 52 for external ISR as needed for a specific task during the mission. One or more other sensors 35 may be retained and concealed within the body 27 while the PDM is extended.

In operation, the apparatus 20 is placed on the ground, floor or other support surface proximate a hostile target with the PDM 50 in the retracted position. As used herein, a target refers to any surface, particularly a ferrous surface, associated with a hostile actor and which can accept a payload 51 with or without the apparatus 20 attached thereto. An operator guides the apparatus 20 using a RC transmitter to a remote hostile target, such as a car, tank, trailer, etc. having a ferrous underside. If desired, the one or more sensors 35 may transmit control data through the transceiver 33 to the operator to establish a baseline prior to transmitting intelligence, surveillance and reconnaissance (ISR). The apparatus 20 stops in a suitable position under the hostile target, or alternatively deploys while on the move.

Figure 4:
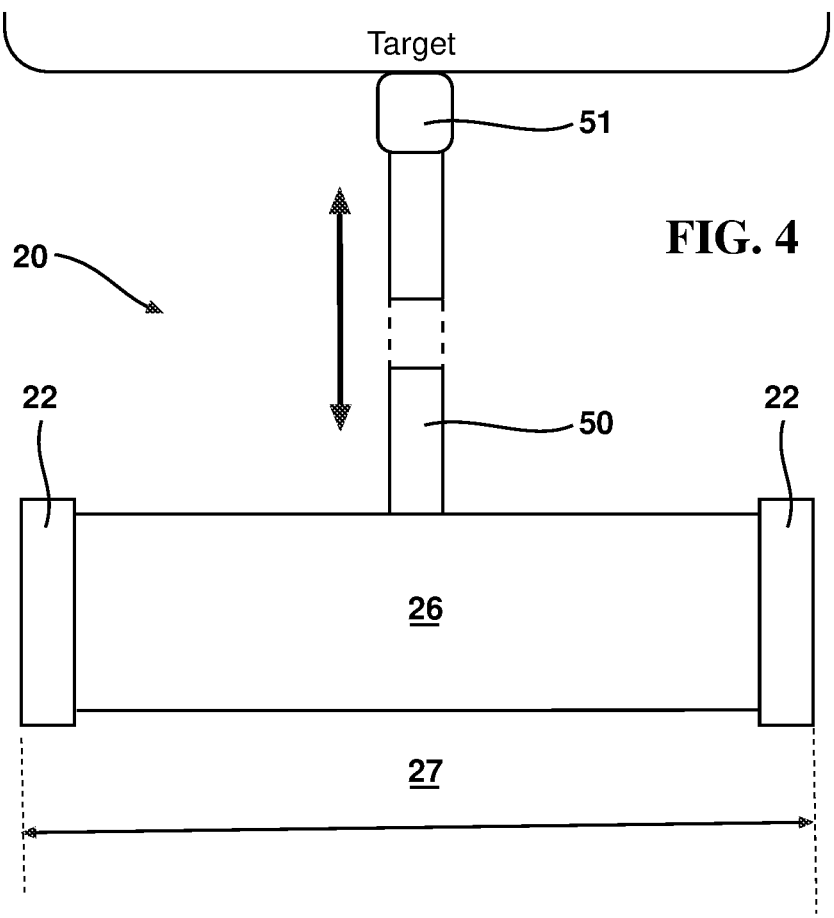
FIG. 4 is schematic frontal view of an apparatus having a payload intercepting a target.
Figure 4A:
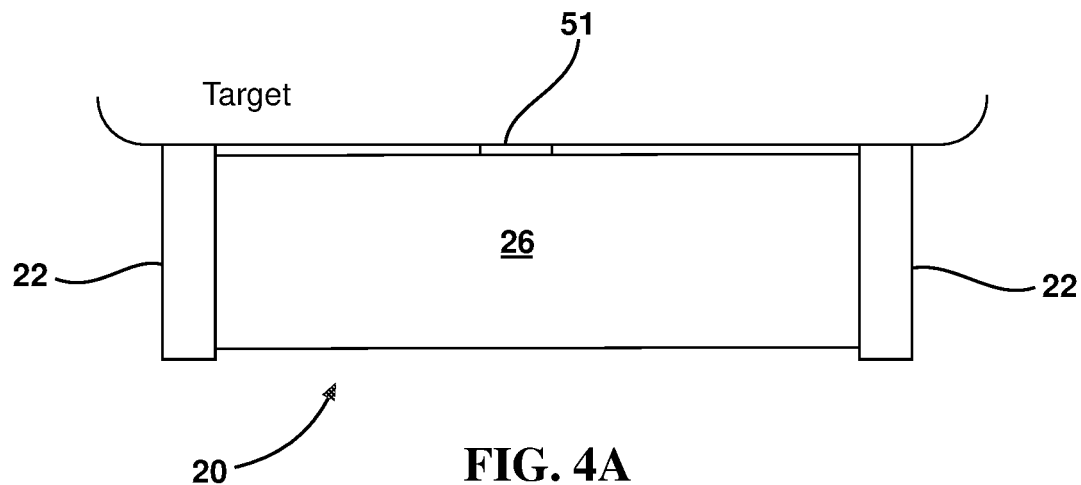
FIG. 4A is a schematic frontal view of the apparatus of FIG. 4 in a retracted position.

Referring to FIG. 4 and FIG. 4A, the PDM 50 is extended through the port 28, so that the stand 52 is vertically elevated towards the underside of the target. The magnet(s) contact the underside of the target, attaching the apparatus 20 thereto. The PDM 50 is retracted, drawing the body 27 of the apparatus 20 upwards, until the apparatus 20 intercepts the underside of the target. This step provides the benefit that the apparatus 20 is less noticeable and less likely to become dislodged. The sensors 35 may then transmit intelligence, surveillance and reconnaissance (ISR) to the operator in the form of data gathered from the sensor(s) 35. This arrangement provides the benefit that the body 27 of the apparatus 20 can hold multiple sensors 35, thereby providing more data to the operator.

Figure 4B:
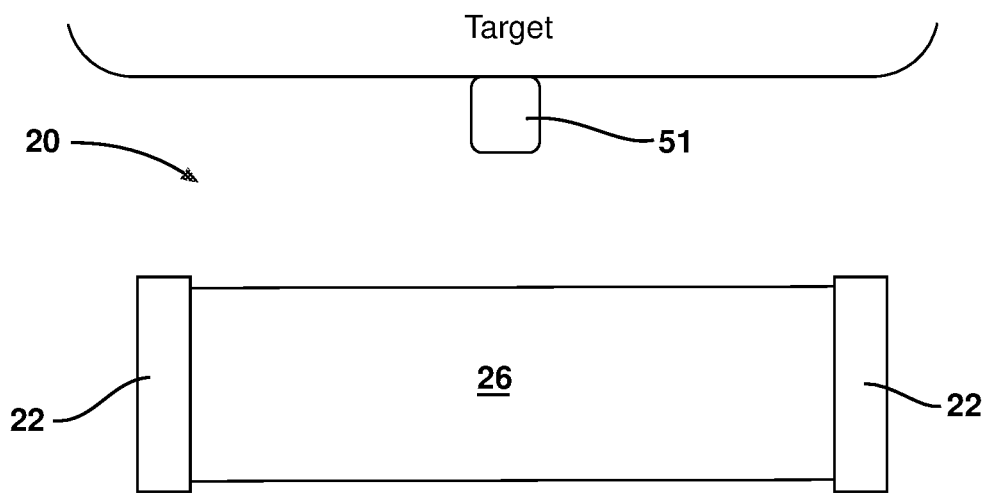
FIG. 4B is a schematic side elevational view of a payload deployed onto a target and separated from the apparatus.

Referring to FIG. 4B, alternatively, in use the PDM 50 may have a detachable payload 51. The payload 51 is magnetically attached to the desired surface upon deployment and separates from the stand 52. The PDM 50 retracts, leaving only the payload 51 attached to the target. This arrangement provides the benefit that the payload 51 is smaller and lighter than the entire body 27 and less susceptible to discovery.

Figure 5:
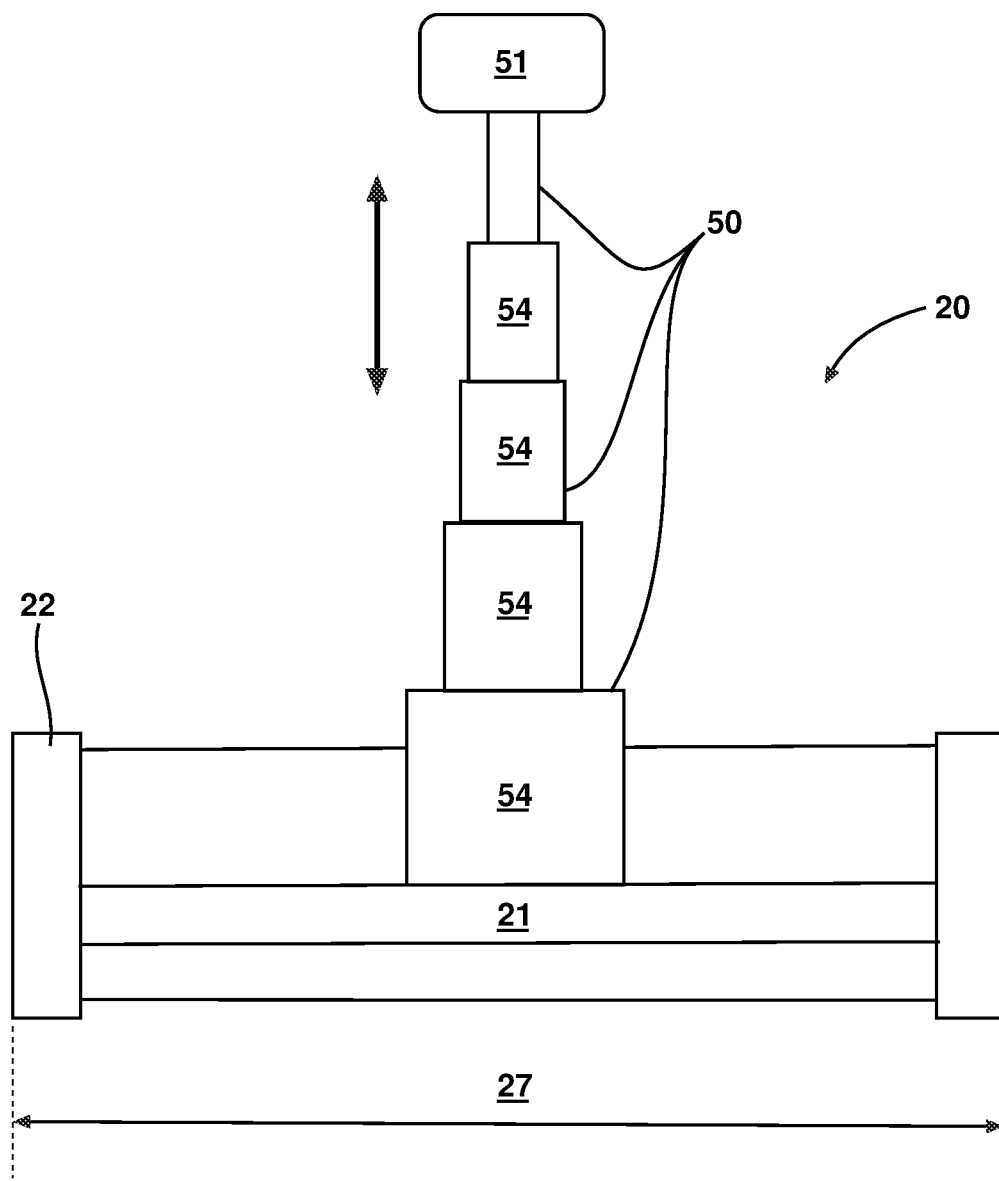
FIG. 5 is a schematic frontal sectional view of an alternative embodiment of an apparatus having a five stage telescoping arm PDM, with several components omitted for clarity.

Referring to FIG. 5, in an alternative embodiment, the PDM 50 may comprise a telescoping arm 54. As discussed above, the telescoping arm 54 PDM 50 has a retracted position for motion and an extended position for deployment. The telescoping arm 54 PDM 50 may have from 2 to 5 stages, and extended length of about 30 cm to about 60 cm. The diameter of the first stage is preferably limited to the width of the stage, to prevent overhang. The telescoping arm 54 comprises nested stages of monotonically successively smaller diameters as the distal stage is approached. A spring steel wire may be disposed inside the stages and advanced and retracted from a spool as is known in the art to manipulate the stages of the telescoping arm 54.

This embodiment provides the benefit that the footprint of the PDM 50 on the frame 21 is smaller than the footprint of a scissor jack 53, providing space for additional internal components. Also the telescoping arm 54 PDM 50 enables use with a smaller and less conspicuous port 28.

Figure 6:
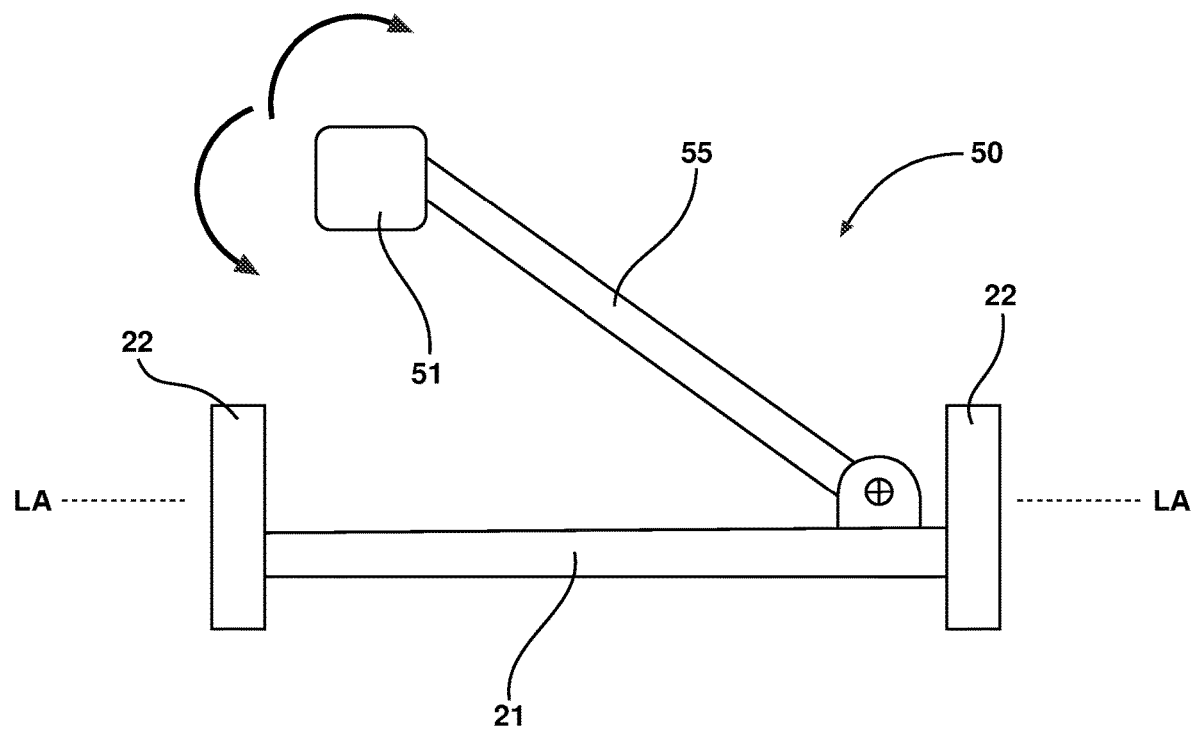
FIG. 6 is a schematic frontal sectional view of an alternative embodiment of an apparatus having an articulating arm PDM, with several components omitted for clarity.

Referring to FIG. 6, in an alternative embodiment, the PDM 50 may comprise an articulating arm 55. As discussed above, the telescoping arm 54 PDM 50 has a retracted position for motion and an extended position for deployment. The articulating arm 55 may be longitudinally parallel when retracted and articulate to an angle relative to the longitudinal axis LA of about 80 degrees to about 95 degrees, preferably about 90 degrees, when extended. Other components disposed on the upper surface may be disposed outboard of the articulating arm 55 PDM 50 to prevent interference when deployed. This embodiment provides the benefit that the articulating arm 55 PDM 50 may intercept a target surface at various angles relative to the support surface. In one embodiment, the base of the articulating arm 55 may be connected via a rotary joint and actuated by a DC motor 24, such as a stepper motor 24. The distal end of the arm 55 could be a passive pivot joint or could be actuated by another motor (not shown).

In yet another embodiment, the arm 55 may include a combination of articulating and telescoping arms 54. This embodiment provides the benefit of the reach provided by a telescoping arm 54 while allowing storage along the longitudinal direction of the apparatus 20, allowing for longer telescopic segments to be used.

Figure 7:
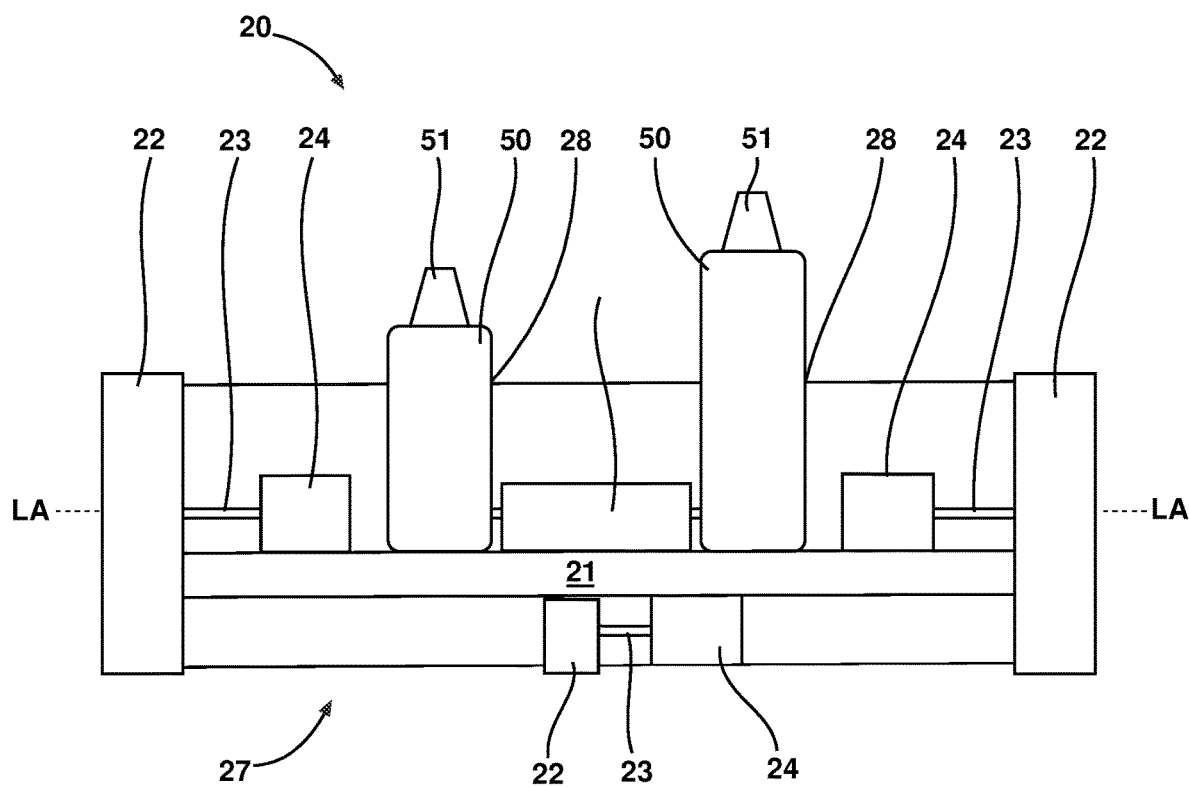
FIG. 7 is a schematic frontal sectional view, shown partially in cutaway, of an alternative embodiment of an apparatus having plural payload delivery mechanisms in two different extended positions, with two different payloads and three wheels, the view having several components omitted for clarity.

Referring to FIG. 7, in an alternative embodiment the apparatus 20 may comprise plural payload 51 delivery mechanisms 50. For example, a first PDM 50 and a second PDM 50 may be disposed on either side of the centerline plane of the longitudinal axis LA. Such payload 51 delivery mechanisms 50 may comprise a scissor jack 53, telescoping arm 54 or combination thereof to conserve footprint on the frame 21. The plural payload 51 delivery mechanism may be deployed through a common port 28 or each PDM 50 may have a respective dedicated port 28. This embodiment provides the benefit of redundancy should one PDM 50 fail, the benefit that different payloads 51 may be deployed and plural targets accessed with a single apparatus 20.

If desired, in an alternative embodiment the apparatus 20 may comprise an axially rotatable, optionally motorized, third wheel 22 longitudinally intermediate the first wheel 22 and second wheel 22 if only a single PDM 50 is used. More particularly the third wheel 22 may be intermediate the first PDM 50 and second PDM 50. Such a third wheel 22 may be connected to the lower surface of frame 21 and have a diameter less than one-half the diameter of the first and second wheels 22 for clearance. This embodiment provides the benefit of additional traction for propulsion on irregular terrain. Optionally the third wheel 22 may be an idler wheel 22 or the third wheel 22 may be the only drive wheel 22 and the first and second wheels 22 be idler wheels 22. Of course more than three wheels 22 may be utilized as desired.

Various embodiments are shown which may be used individually or in any combination. All values disclosed herein are not strictly limited to the exact numerical values recited. Unless otherwise specified, each such dimension is intended to mean both the recited value and a functionally equivalent range surrounding that value. For example, a dimension disclosed as "40 mm" is intended to mean "about 40 mm." Every document cited herein, including any cross referenced or related patent or application, is hereby incorporated herein by reference in its entirety unless expressly excluded or otherwise limited. The citation of any document or commercially available component is not an admission that such document or component is prior art with respect to any invention disclosed or claimed herein or that alone, or in any combination with any other document or component, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa. While particular embodiments of the present invention have been illustrated and described, it would be obvious to those skilled in the art that various other changes and modifications can be made without departing from the spirit and scope of the invention. It is therefore intended the appended claims cover all such changes and modifications that are within the scope of this invention.

What is claimed is:

1. An apparatus for conducting ISR in a hostile environment, the apparatus comprising:
    a horizontally oriented hollow body having a longitudinal axis and a skin configured to conceal components therein;
    a longitudinally elongate gravity stable frame disposed within the hollow body; the frame having an upper surface and a lower surface opposed thereto;
    two longitudinally opposed, axially rotatable wheels operably associated with the body;
    a battery powered motor rotatably associated with each wheel;
    a controller for controlling the battery powered motor;
    a transceiver for receiving remote control signals from an operator and feeding the control signals to the controller;
    at least one counterweight joined to the frame below the longitudinal axis, whereby the at least one counterweight is adapted to keep the frame gravity stable;
    at least one sensor for gathering ISR from the hostile environment and transmitting the ISR to an operator remote from the location of the apparatus; and
    a battery for powering the apparatus and being connected to the frame.

2. An apparatus according to claim 1 further comprising a payload delivery mechanism (PDM), the PDM being concealable within the body while the body is in motion and being configured to discharge a payload from inside the hollow body, through a port and to a target at the point of deployment.

3. An apparatus according to claim 2 wherein the PDM has a distal end extendable outwardly from the hollow body of the apparatus and having a distal end with a stand thereon and wherein the at least one sensor is disposed on the stand.

4. An apparatus according to claim 3 wherein the at least one sensor comprises a first person forward looking camera.

5. An apparatus according to claim 4 wherein the at least one sensor further comprises a rearward looking camera.

6. An apparatus according to claim 1 wherein the at least one sensor comprises a microphone.

7. An apparatus for conducting ISR in a hostile environment, the apparatus comprising:
    a horizontally oriented cylindrical hollow body having a longitudinal axis, and being covered by an outer camouflage skin;

a longitudinally elongate gravity stable frame disposed within the hollow body; the frame having an upper surface and a lower surface opposed thereto;

first and second longitudinally opposed axially rotatable wheels, operably associated with the body;

first and second battery powered motors rotatably associated with the first and second rotatable wheels, respectively;

a controller for controlling the battery powered motors;

a transceiver for receiving remote control signals from an operator, transmitting ISR to the operator and feeding the control signals to the controller;

first and second counterweights juxtaposed with the first and second wheels, respectively, the first and second counterweights being joined to the lower surface of the frame, whereby the first and second counterweights are adapted to keep the frame gravity stable;

at least one sensor connected to the frame and being suitable for gathering ISR from the hostile environment and transmitting the ISR to an operator remote from the location of the apparatus;

a battery for powering the apparatus and being joined to the frame; and a payload joined to the stand, wherein the payload covers the port while the apparatus is in motion, the payload being configured to be aesthetically similar to the outer skin.

8. An apparatus according to claim 7 wherein the payload is detachable from the stand.

9. An apparatus according to claim 8 wherein the detachable payload is magnetically attachable to a ferrous target.

10. An apparatus according to claim 9 wherein the payload comprises an explosive.

11. An apparatus according to claim 9 wherein the payload comprises the at least one sensor.

12. An apparatus according to claim 11 wherein the at least one sensor comprises a radiation detector configured to detect IR, UV or visible wavelength radiation.

13. An apparatus according to claim 11 wherein the at least one sensor comprises a microphone configured to receive soundwaves and transmitted the received sound waves to a remote operator.

14. An apparatus according to claim 11 wherein the at least one sensor comprises a GPS tracking device.

15. An apparatus for conducting ISR in a hostile environment, the apparatus comprising:
a horizontally oriented cylindrical hollow body having a longitudinal axis covered by an opaque outer skin;
a longitudinally elongate gravity stable frame disposed within the hollow body; the frame having an upper surface and a lower surface opposed thereto;
first and second longitudinally opposed axially rotatable wheels, operably associated with the body;
first and second battery powered motors rotatably associated with and powering the first and second rotatable wheels, respectively, the first and second wheels and the first and second motors being disposed on the upper surface of the frame;
a controller for controlling the battery powered motors and being joined to the lower surface of the frame;
a receiver joined to the frame for receiving remote control signals from an operator, transmitting ISR to a remote operator and feeding the control signals to the controller;
a forward first person view camera disposed on the upper surface of the frame, operably joined to the controller and having a forward view outward through a lens in skin;
first and second counterweights juxtaposed with the first and second wheels, respectively, the first and second counterweights being joined to the lower surface of the frame, whereby the first and second counterweights are adapted to keep the frame gravity stable; and
a battery for powering the apparatus and being joined to the lower surface of the frame.

16. An apparatus according to claim 15 further comprising a bilateral payload delivery mechanism (PDM) joined to the upper surface of the frame and having a proximal end joined to the frame and a distal end remote therefrom and having a stand for receiving a payload, the PDM being concealable within the body while the body is in motion and being configured to elevate a payload from inside the hollow body, through a port through the skin to thereby gather ISR from a sensor operably associated with the payload.

17. An apparatus according to claim 16 wherein the payload covers the port while the apparatus is in motion, the payload being configured to be aesthetically similar to the outer skin.

18. An apparatus according to claim 16 wherein the sensor operably associated with the payload comprises a second camera.

19. An apparatus according to claim 18 wherein the second camera is rotatable about a vertical axis when the bilateral PDM is elevated through the port.

20. An apparatus according to claim 16 wherein the sensor operably associated with the payload comprises an omnidirectional microphone.

21. An apparatus for conducting ISR in a hostile environment, the apparatus comprising:
a horizontally oriented hollow body having a longitudinal axis and a skin configured to conceal components therein;
a longitudinally elongate gravity stable frame disposed within the hollow body; the frame having an upper surface and a lower surface opposed thereto;
two longitudinally opposed, axially rotatable wheels operably associated with the body;
a battery powered motor rotatably associated with each wheel;
a controller for controlling the battery powered motor;
a transceiver for receiving remote control signals from an operator and feeding the control signals to the controller;
at least one counterweight joined to the frame below the longitudinal axis, whereby the at least one counterweight is adapted to keep the frame gravity stable;
at least one sensor for gathering ISR from the hostile environment and transmitting the ISR to an operator remote from the location of the apparatus;
a battery for powering the apparatus and being connected to the frame; and
an extendible and retractable payload delivery mechanism (PDM), the PDM being concealable within the body while the body is in motion and being configured to discharge a payload from inside the hollow body, through a port and to a target at the point of deployment.

22. An apparatus for delivering a payload in a hostile environment, the apparatus comprising:
a hollow body having a longitudinal axis and a port therethrough;

a longitudinally elongate gravity stable frame disposed within the hollow body; the frame having an upper surface and a lower surface opposed thereto;

two longitudinally opposed, axially rotatable wheels operably associated with the body;

a battery powered motor rotatably associated with each wheel;

a controller for controlling the battery powered motor;

a receiver for receiving remote control signals from an operator and feeding the control signals to the controller;

at least one counterweight disposed within the hollow body below the longitudinal axis, whereby the at least one counterweight is adapted to keep the frame gravity stable;

a payload delivery mechanism (PDM), the PDM being concealable within the body while the body is in motion and being configured to discharge a payload from inside the hollow body, through the port and to a target at the point of deployment; and a battery for powering the apparatus and being connected to the frame.

\* \* \* \* \*